(12) United States Patent
Lake

(10) Patent No.: US 8,807,492 B2
(45) Date of Patent: Aug. 19, 2014

(54) PIPE CRIB-BLOCK

(71) Applicant: Western Oilfields Supply Company, Bakersfield, CA (US)

(72) Inventor: John W. Lake, Bakersfield, CA (US)

(73) Assignee: Western Oilfields Supply Company, Bakersfield, CA (US)

( * ) Notice: Subject to any disclaimer, the term of this patent is extended or adjusted under 35 U.S.C. 154(b) by 0 days.

(21) Appl. No.: 13/740,057

(22) Filed: Jan. 11, 2013

(65) Prior Publication Data

US 2014/0197283 A1 Jul. 17, 2014

(51) Int. Cl.
*F16L 3/22* (2006.01)
*F16M 11/00* (2006.01)
*F16L 3/00* (2006.01)

(52) U.S. Cl.
CPC . *F16M 11/00* (2013.01); *F16L 3/00* (2013.01)
USPC ............................... 248/68.1; 248/73; 248/65

(58) Field of Classification Search
CPC .............. F16L 3/00; F16L 3/22; F16M 11/00
USPC .............. 248/68.1, 65, 72, 73, 74.4, 62, 74.3, 248/74.1, 49
See application file for complete search history.

(56) References Cited

U.S. PATENT DOCUMENTS

| | | | |
|---|---|---|---|
| 2,354,919 A * | 8/1944 | Lockwood | 248/68.1 |
| 3,026,076 A * | 3/1962 | Bender | 248/49 |
| 3,464,661 A * | 9/1969 | Alesi, Jr. | 248/68.1 |
| 3,523,667 A * | 8/1970 | Guerrero | 248/49 |
| 3,558,138 A * | 1/1971 | Lemelson | 273/157 R |
| 3,590,752 A * | 7/1971 | De Pew | 108/55.3 |
| 3,717,948 A * | 2/1973 | Schnabel | 446/128 |
| 3,856,246 A * | 12/1974 | Sinko | 248/68.1 |
| 4,003,144 A * | 1/1977 | Maddestra et al. | 434/403 |
| 4,030,540 A * | 6/1977 | Roma | 165/172 |
| 4,093,076 A * | 6/1978 | Newton | 211/74 |
| 4,099,626 A * | 7/1978 | Magnussen, Jr. | 211/60.1 |
| 4,167,211 A * | 9/1979 | Haller | 165/78 |
| 4,199,070 A * | 4/1980 | Magnussen, Jr. | 211/60.1 |
| 4,202,520 A * | 5/1980 | Loos et al. | 248/68.1 |
| 4,601,447 A * | 7/1986 | McFarland | 248/49 |
| 4,618,114 A * | 10/1986 | McFarland | 248/65 |
| 4,796,540 A * | 1/1989 | Pelfrey | 108/55.3 |
| 4,899,963 A * | 2/1990 | Murphy | 248/65 |
| 4,942,967 A * | 7/1990 | Schneider | 211/74 |
| 5,061,218 A * | 10/1991 | Garage et al. | 446/102 |
| 5,072,901 A * | 12/1991 | Scott | 248/49 |
| 5,344,143 A * | 9/1994 | Yule | 273/118 R |
| 5,451,177 A * | 9/1995 | Gilman | 446/128 |

(Continued)

*Primary Examiner* — Nkeisha Smith
(74) *Attorney, Agent, or Firm* — Holland & Knight LLP; Richard E. Lyon, Jr.

(57) ABSTRACT

A pipe crib-block for supporting a portion of hose or pipe in an elevated disposition. The pipe crib-block comprises a body portion causing a generally flat lower support surface and an upper surface defining a generally wedge-shaped trough in a central portion thereof. A pair of engagement keys project upwardly from the upper surface on opposed sides of the trough and a pair of key receiving apertures are disposed in the lower surface of the body portion. The apertures are axially aligned with the engagement keys and configured to receive therein and cooperate with the engagement keys on a second pipe crib-block such that two or more pipe crib-blocks can be stacked in interlocked parallel or perpendicular orientations so as to define a supporting structure for the pipe or hose at variable elevations.

3 Claims, 4 Drawing Sheets

(56) References Cited

U.S. PATENT DOCUMENTS

| | | | |
|---|---|---|---|
| 5,794,897 A * | 8/1998 | Jobin et al. | 248/74.4 |
| 5,830,032 A * | 11/1998 | Campbell | 446/128 |
| 5,944,575 A * | 8/1999 | Tolnay | 446/168 |
| 5,971,663 A * | 10/1999 | Brothers | 405/125 |
| 5,996,945 A * | 12/1999 | Coles et al. | 248/68.1 |
| 6,079,673 A * | 6/2000 | Cox | 248/63 |
| 6,250,591 B1 * | 6/2001 | Cunningham | 248/65 |
| 6,340,323 B1 * | 1/2002 | Glynn | 446/89 |
| 6,378,811 B1 * | 4/2002 | Potter et al. | 248/68.1 |
| 6,474,613 B2 * | 11/2002 | O'Malley | 248/346.02 |
| 6,520,456 B1 * | 2/2003 | Neider et al. | 248/49 |
| 6,561,466 B1 * | 5/2003 | Myers et al. | 248/74.4 |
| 7,007,900 B2 * | 3/2006 | Goodwin et al. | 248/68.1 |
| 7,175,138 B2 * | 2/2007 | Low et al. | 248/68.1 |
| 7,278,613 B2 * | 10/2007 | Roy | 248/49 |
| 7,441,731 B2 * | 10/2008 | Smart et al. | 248/74.1 |
| 7,484,698 B2 * | 2/2009 | Budagher | 248/68.1 |
| 7,731,131 B2 * | 6/2010 | Trueb | 248/49 |
| 7,806,374 B1 * | 10/2010 | Ehmann et al. | 248/67.5 |
| 8,074,945 B2 * | 12/2011 | Schoenau et al. | 248/74.4 |
| 8,292,238 B2 * | 10/2012 | Wakeman et al. | 248/68.1 |
| 8,376,290 B2 * | 2/2013 | Tollefson | 248/68.1 |
| D677,558 S * | 3/2013 | Frandsen | D8/356 |
| 8,475,226 B2 * | 7/2013 | Comfort | 446/168 |
| 2006/0096197 A1 * | 5/2006 | Tollefson | 52/223.13 |
| 2011/0303456 A1 * | 12/2011 | Blanchard et al. | 174/480 |

* cited by examiner

PIPE CRIB-BLOCK

BACKGROUND OF THE INVENTION

The present invention relates to a portable pipe support also known as a pipe crib-block. Such devices are used to support a length of pipe or hose in an elevated position, generally proximate the suction or discharge end of a pump. Heretofore, such supports typically have been formed by lengths of wood or cribbing and a plurality of wooden or plastic wedges arranged under the pipe so as to support the pipe in the desired elevated position. Such devices provide minimal lateral support for the elevated pipe or hose and can be labor extensive in forming the several components into a suitable stacked arrangement to serve the desired purpose. Wooden pipe saddles have been developed which generally comprise a plurality of stacked lengths of wood secured to each other with the uppermost length defining in its upper surface a semicircular arch to accommodate a correspondingly sized pipe or hose. Such devices reduce the labor necessary to form the supporting structure and do provide some degree of lateral support for the pipe/hose as a result of the arcuate trough within which the pipe or hose rests. While such saddles may represent an improvement over the use of cribbing and wedges, they still provide limited vertical flexibility and stability and depending on the correlation of the pipe/hose size with the particular radius of the semicircular support arch therein, limited lateral support. To increase the elevation of the overall support structure, multiple saddles typically must be strapped or otherwise secured together and the resulting structure has limited stability. Unless the pipe diameter matches the curvature of the arch in the saddle, very limited lateral support is provided by the arch for the elevated pipe or hose. Also, such saddles are heavy and bulky and thus create additional assembly installation, disassembly and mobility issues. The pipe crib-block of the present invention addresses and obviates these shortcomings in the prior art.

SUMMARY OF THE INVENTION

Briefly, the pipe crib-block of the present invention comprises a lightweight body portion defining an upper support surface and a lower support surface. The upper support surface defines a generally wedge-shaped trough therein for supporting therein differently sized pipe or hose. Laterally spaced engagement keys are formed in the upper support surface on opposed sides of the trough and a pair laterally spaced key receiving openings are formed in the lower support surface. The engagements keys and receiving apertures are configured and positioned such that a plurality of pipe crib-blocks can be vertically stacked with the engagement keys on one block projecting into and mating with the key receiving apertures on another block, thereby interlocking the stacked blocks to prevent relative shifting during use and the potential collapse of the stacked support structure. Preferably, the engagement keys and key receiving apertures are square in cross-section or otherwise shaped so as to accommodate perpendicular orientations of vertically adjacent interlocked blocks whereby enlarged and enhanced stability supporting structures comprising multiple interlocked pipe crib-blocks can be readily formed.

DETAILED DESCRIPTION OF THE PREFERRED EMBODIMENT

Figure 1:
FIG. 1 illustrates a wooden pipe saddle found in the prior art.
Figure 2:
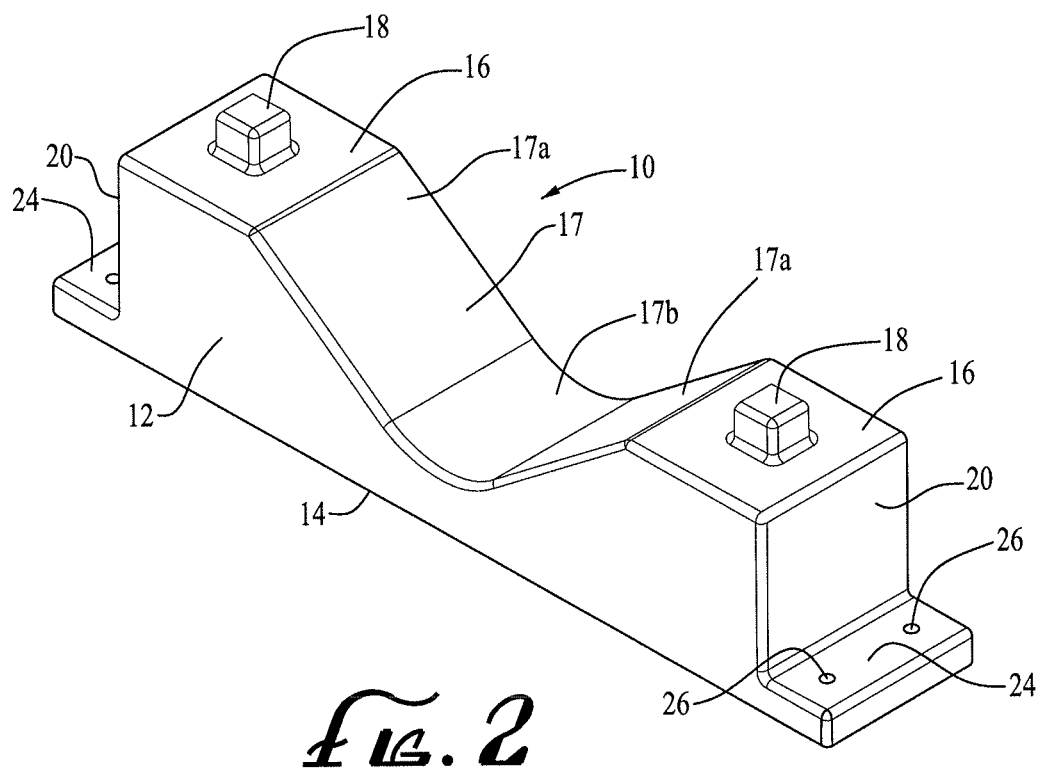
FIG. 2 is a perspective view of the pipe crib-block of the present invention.

Referring now in detail to the drawings, the pipe crib-block 10 of the present invention is preferably of single-piece construction and formed of a durable plastic material such as high density polyethylene (HDPE). The crib-block 10 defines a body portion 12 having a generally flat horizontal lower support surface 14 and an upper support surface 16. The upper surface 16 defines a generally wedge-shaped trough 17 in a central portion of body portion 12 for supporting a portion of a pipe or hose therein. Preferably, trough 17 is defined by generally opposed inclined portions 17a of said upper support surface and a curvilinear lower portion 17b of said upper support surface extending therebetween and merging into said inclined portions 17b so as to accommodate and provide lateral support for a variety of pipe and hose diameters. A pair of engagement keys 18 project upwardly from the upper surface 16 on opposed sides of trough 17, proximate the side walls 20 of the body portion 12. A pair of key receiving apertures 22 are provided in the lower surface 14 of the body portion. Apertures 22 are axially aligned with keys 18 and configured to mate with the sides 18' thereof whereby two or more pipe crib-blocks 10 can be stacked in an interlocked vertical configuration as shown in FIG. 5.

To enhance the versatility and stability of the present invention, particularly when the pipe crib-blocks 10 are used in a stacked configuration to provide additional elevation, the engagement keys 18 and mating receiving apertures 22 are configured so as to accommodate perpendicular orientations of vertically adjacent interlocked blocks. In the preferred embodiment, keys 18 and apertures 22 are square in cross-section and oriented so as to allow the blocks to be interlocked in stacked pairs with each pair of blocks being displaced ninety degrees from the vertically adjacent pair or pairs, as shown, for example, in FIG. 6. Such a configuration both enlarges the footprint of the formed support structure and the size of the supporting trough, providing substantially more stability for the elevated support provided by the crib-blocks.

In a preferred configuration of the pipe crib-block 10 of the present invention, a pair of integrally formed flanges 24 project laterally from the opposed side walls 20 of body portion of block 10 so as to define lateral extensions of the lower support surface. One or more apertures 26 (two being shown) project through each flange for receiving a concrete nail, rod, screw or other supporting member (not shown) to selectively anchor the pipe crib-block to a supporting surface.

Figure 5:
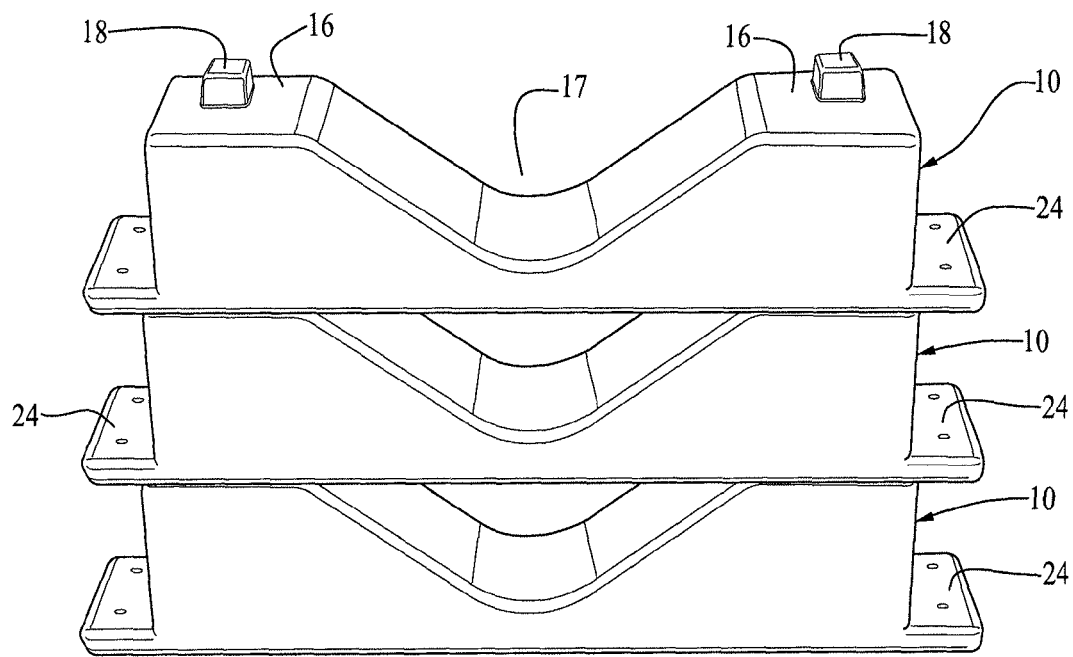
FIG. 5 is a perspective view of a pair of interlocked pipe crib-blocks of the present invention for supporting a pipe in a more elevated position.
Figure 6:
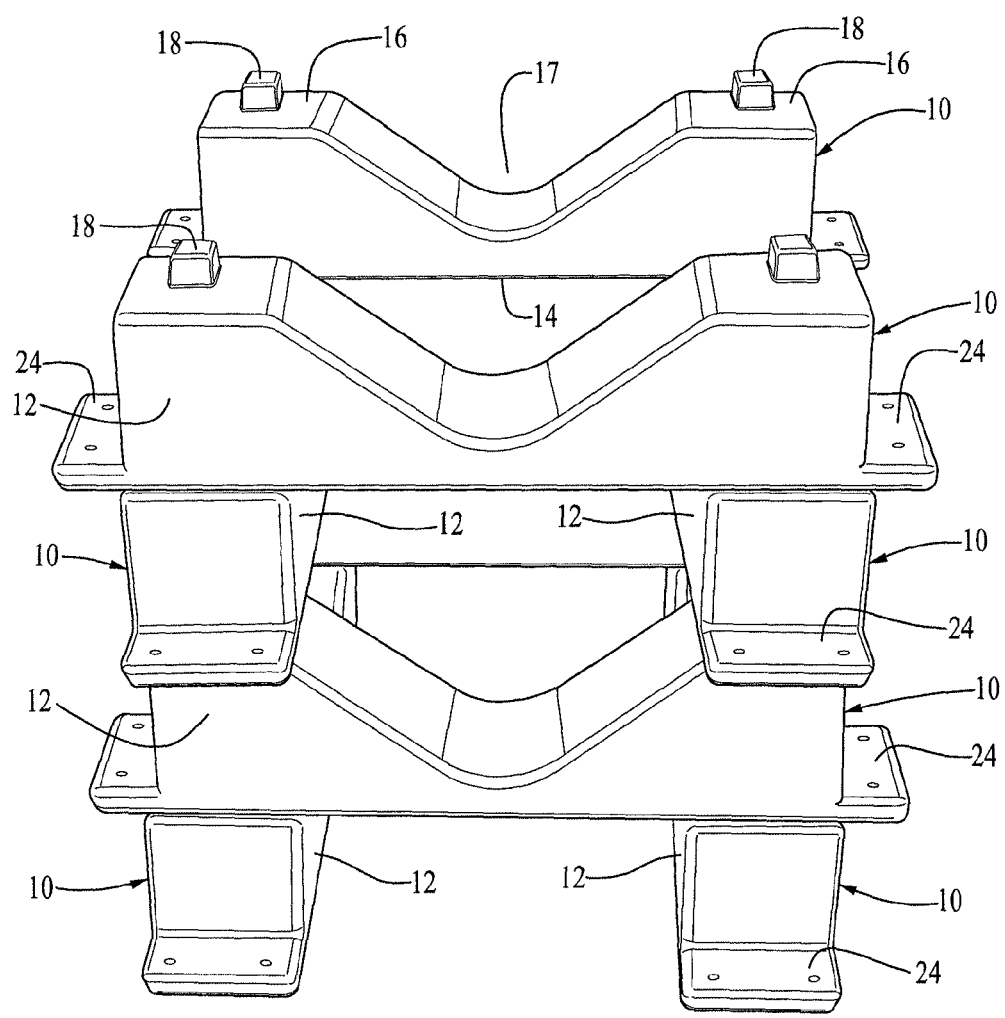
FIG. 6 is a perspective view of an example of multiple interlocked pipe crib-blocks providing additional elevation and enhanced lateral support for the pipe or hose.

In a stacked configuration of blocks such as those illustrated in FIGS. 5 and 6, the lowermost block would likely be so anchored if the footing were not sufficiently stable for the particular application.

Thus, the pipe crib-block 10 of the present invention can be used individually or in an interlocked stacked configuration with one or more additional crib-blocks to securely support a pipe or hose at a desired elevation. The elevation of the support provided by the present invention is defined by the height of the body portion 12 of the crib-blocks used, the depth of the wedge-shaped trough 17, the diameter of the pipe being supported therein and the number and configuration of the stacked crib-blocks.

Figure 3:
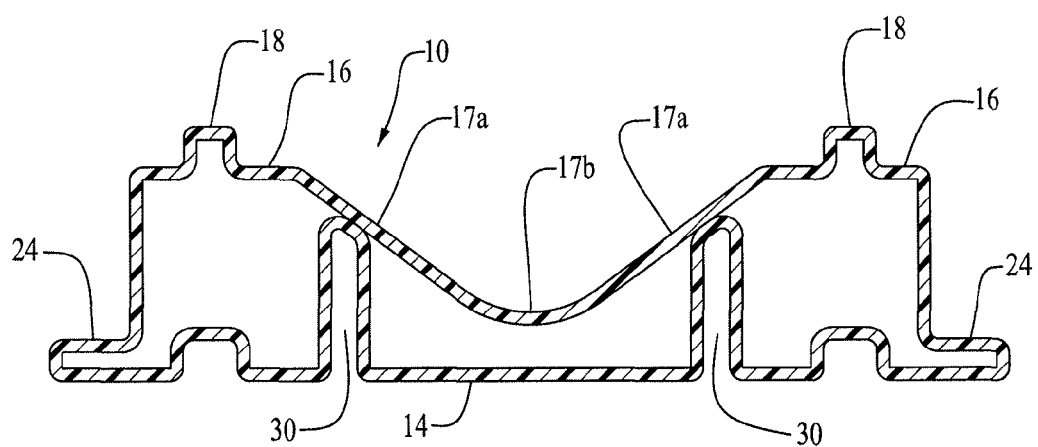
FIG. 3 is a sectional view taken along the line 2-2 in FIG. 1.
Figure 4:
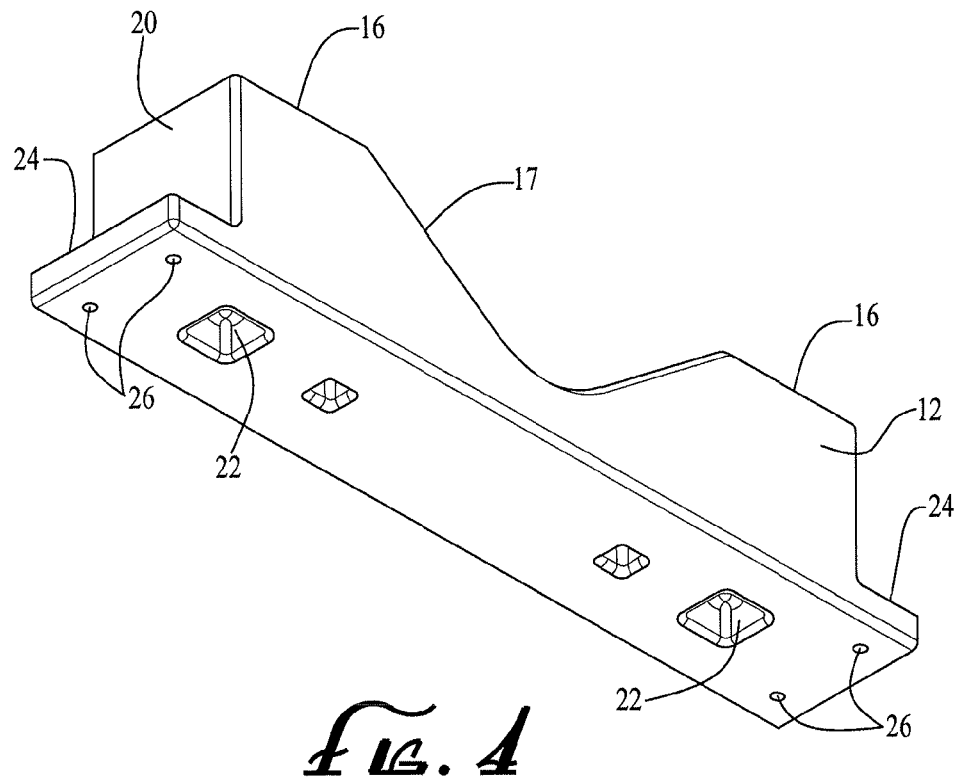
FIG. 4 is a perspective view of the present invention illustrating the underside thereof.

The pipe crib-blocks 10 are preferably rotatably molded of HDPE, although other durable lightweight materials and forming processes could be used. To provide the rotatably molded crib-block with sufficient rigidity, while minimizing the weight thereof, a pair of interior support columns 30 preferably are molded into the interior of the structure (see, FIG. 3). The pipe crib-block 10 can be formed in any desired size depending on the application, although the generally wedge-shaped configuration of the supporting trough 17 accommodates a wide variety of pipe/hose sizes. By way of example only, a pipe crib-block having the dimensions illustrated in FIG. 7 can securely hold pipe or hose ranging in diameter from about 4 inches to 12 inches.

Figure 7:
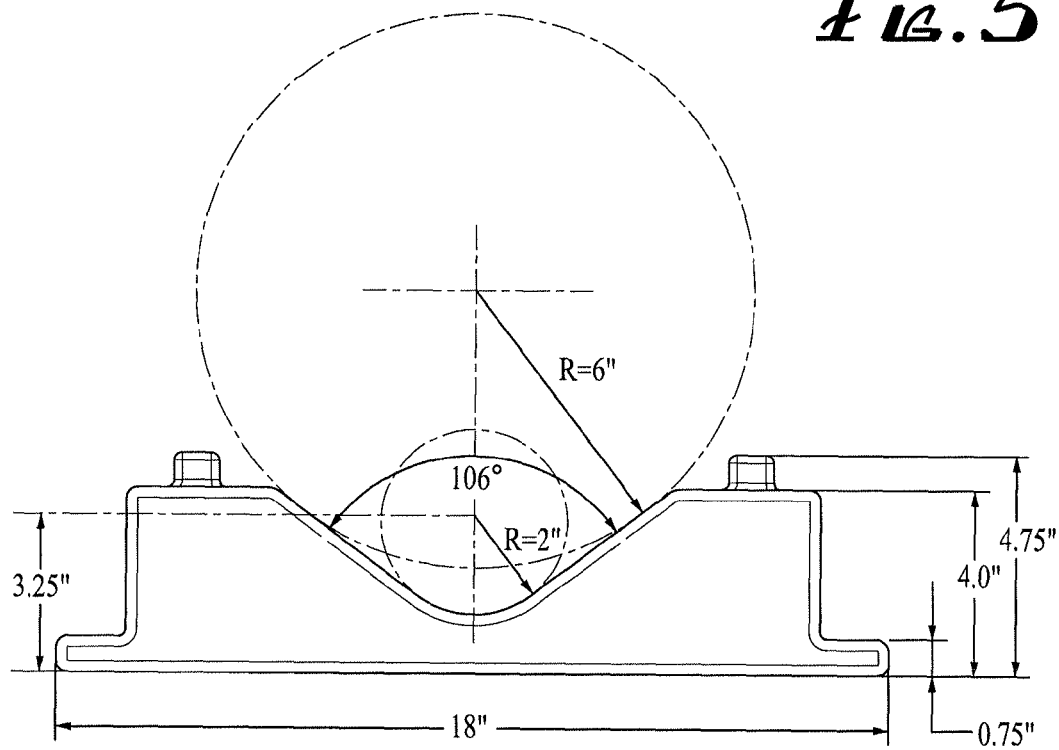
FIG. 7 is a side view of a pipe crib-block of the present invention setting forth one example of relative dimensions thereof.

It is to be understood that the dimensions illustrated in FIG. 7 are by way of example only. Those dimensions as well as various other changes and modifications can be made in carrying out the present invention without departing from the spirit and scope thereof. Insofar as such changes and modifications are within the purview of the appended claims, they are to be considered as part of the present invention.

What is claimed is:

1. A pipe and hose support comprised of a plurality of interlocked crib-blocks and defining a pair of axially spaced generally wedge-shaped surfaces for supporting therein portions of a hose or pipe in a stable disposition at a desired elevation, each of said crib-blocks comprising an elongated body portion having a generally flat lower support surface, an upper support surface and opposed ends, said upper support surface defining a generally wedge-shaped single trough in a central portion thereof, only a single engagement key projecting upwardly from said upper surface proximate each of said opposed ends of said body portion and a pair of key receiving apertures disposed in said lower surface of said body portion, said apertures being axially aligned with said engagement keys and configured to receive and cooperate with one of said engagement keys on another of said crib-blocks so as to prevent relative rotation thereof and form an interlocked stack of vertically adjacent pairs of parallel crib-blocks wherein the parallel crib-blocks in each of said pairs extend in a horizontal disposition perpendicular to and interlock with the crib-blocks in at least one vertically adjacent pair of crib-blocks so as to define and interlock said pair of axially spaced generally wedge-shaped surfaces for supporting portions of a pipe or hose in a stable disposition at a desired elevation.

2. The pipe and hose support of claim 1 wherein a cross-sectional configuration of said engagement keys and said key receiving apertures are square.

3. The pipe and hose support of claim 1 wherein the engagement keys on each of the crib-blocks in one of said pairs of crib-blocks extend into one of the key receiving apertures in each of the crib-blocks of a vertically adjacent perpendicularly disposed pair of crib-blocks whereby each pair of crib-blocks is interlocked with at least two other crib-blocks.

* * * * *